(12) United States Patent
Cok

(10) Patent No.: US 6,298,154 B1
(45) Date of Patent: Oct. 2, 2001

(54) METHOD FOR RENDERING IMPROVED PERSONAL HANDWRITING

(75) Inventor: Ronald S. Cok, Harrow (GB)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/280,100

(22) Filed: Mar. 29, 1999

(51) Int. Cl.[7] .............................. G06K 9/18; G06K 9/40; G06T 11/00
(52) U.S. Cl. ........................... 382/186; 382/254; 345/467
(58) Field of Search .................................. 382/119, 186, 382/187, 190, 198, 202, 266, 254; 345/433, 435, 467, 468, 471, 144

(56) References Cited

U.S. PATENT DOCUMENTS

| | | | |
|---|---|---|---|
| 4,817,034 | 3/1989 | Hardin, Sr. et al. | 345/173 |
| 5,327,342 | 7/1994 | Roy | 345/467 |
| 5,412,771 | 5/1995 | Fenwick | 345/4 |
| 5,426,594 | * 6/1995 | Wright et al. | 709/206 |
| 5,889,889 | * 3/1999 | Sinden | 382/187 |
| 6,052,481 | * 4/2000 | Grajski et al. | 382/187 |
| 6,069,978 | * 5/2000 | Peairs | 382/254 |
| 6,125,207 | * 9/2000 | Merchant et al. | 382/190 |

* cited by examiner

Primary Examiner—Amelia M. Au
Assistant Examiner—Mehrdad Dastouri
(74) Attorney, Agent, or Firm—Thomas H. Close

(57) ABSTRACT

A computer implemented method for generating an image of handwritten text having improved appearance, includes the steps of: providing a handwritten sample of the text; generating a digital image of the handwritten sample; processing the digital image of the handwritten sample to generate a digital image of text having improved appearance; and displaying the digital image having improved appearance. According to one approach, the digital image of a handwritten sample is combined with a digital image of the sample written in a normative handwriting font. According to an alternative approach, the digital images of several samples of the same text are combined to produce the improved image.

14 Claims, 4 Drawing Sheets

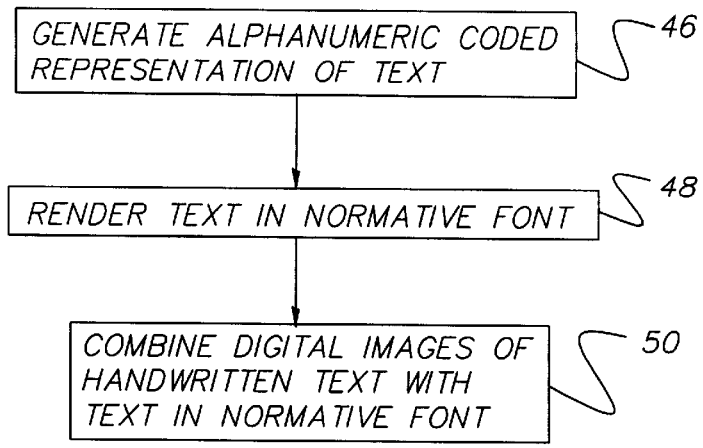
FIG. 3
FIG. 4
FIG. 5
FIG. 6
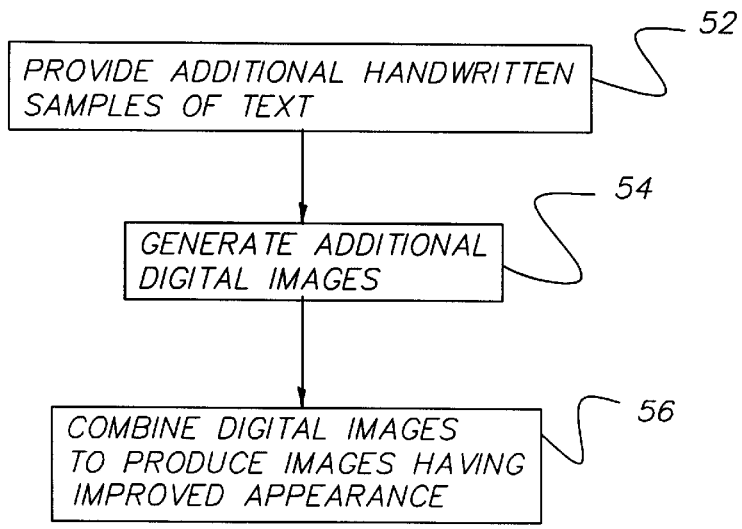
FIG. 7

FIG. 8
FIG. 9
FIG. 10
FIG. 12
FIG. 14
FIG. 11
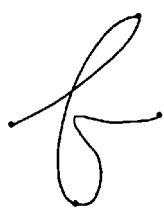
FIG. 13
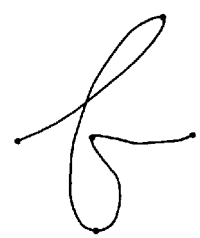
FIG. 15

METHOD FOR RENDERING IMPROVED PERSONAL HANDWRITING

FIELD OF THE INVENTION

The present invention relates to the modification and generation of textual characters which appear to be handwritten.

BACKGROUND OF THE INVENTION

Text and the printed page have been known for hundreds of years. Since the original invention of movable type, typesetters have used a variety of artistic type designs intended to accentuate or clarify their communication. These designs, known as typefaces, are created by skilled artists.

In contrast to the printed page, people have been writing by hand for thousands of years. Although in the past writers may have strictly shaped their letters according to a particular standard, today handwriting is unique to each individual despite being based, at the time of instruction, on a common, normative handwriting model.

Some typeface designers have created typefaces based on the characteristics of handwriting. For example, the typefaces Mistral and Tekton are based on personal handwriting or lettering. There are also computer typefaces designed to resemble cursive writing, such as script, and are commonly found on desktop computers today.

Not only are standard typefaces resembling an individual's handwriting widely available, there are today, commercial services that will create a personal typeface based on a handwriting sample for any customer who desires it. These services create typefaces used on a computer for rendering text. A single character within a handwritten font may take several forms depending on the surrounding, contextual characters; see U.S. Pat. No. 5,412,771, issued May 2, 1995, to Fenwick.

Since the advent of handwriting, handwritten text has been used to personalize communication. An extreme case is the signature, considered to be definitive proof of the writer's identity. More generally, a handwritten communication is taken to be more personal and emotive than a printed textual communication whether printed by computer, typewriter, or other machine.

Printed photographic images for consumers are often personalized with text, that is the photographic print or an object bearing the photographic image contains a message with special meaning to the owner. For example, a picture given as a gift might have a message written on the picture expressing suitable sentiments to the recipient. When written by computer, these personalized messages are rendered from a text string in an existing typeface, in a suitable font, chosen either by the gift creator or by the manufacturer of the product. The text strings are typically entered via keyboard by an operator or by the customer herself.

An additional level of personalization can be obtained by using the customer's own handwriting as the "rendered" text. This handwritten string can be scanned as an image, suitably processed to extract the "handwriting image" and composited into the product (see U.S. patent application Ser. No. 08/752,701). Individuals may also like to provide the appearance of handwritten communications separately from any image or other presentation, for example, in a standard letter.

Unfortunately, many people have practically illegible handwriting and are reluctant to use their own writing, whether manual or computer rendered, for fear of embarrassment. This is especially true when the handwriting is used to personalize a gift. There is a need therefore for an improved method of generating personal handwriting to be used, for example, on personalized gifts and photographs.

SUMMARY OF THE INVENTION

This object is achieved according to the present invention by a computer implemented method for generating an image of handwritten text having improved appearance. According to the method, a user first provides a handwritten sample of the text. Next, a digital image of the handwritten sample is generated. The digital image is then processed in a computer to generate a digital image of text having improved appearance. Finally, the digital image having improved appearance is displayed. In a preferred embodiment of the present invention, the sample is synthesized with an existing, normative type face so as to create a new sample that is representative of the person's handwriting but exhibits characteristics of the normative typeface. These characteristics may include improved legibility, consistency, or quality of appearance. According to one approach, the digital image of a handwritten sample is combined with a digital image of the sample written in a normative handwriting font. According to an alternative approach, the digital images of several samples of the same text are combined to produce the improved image.

The synthesis is accomplished by comparing the same personal and normative characters or connected words (for cursive writing) and combining them to create differently formed characters or words.

By combining a handwritten text sample or text produced by a type face derived from a handwriting sample with a normative handwriting sample of the same text, a modified sample of personal handwriting that improves upon and maintains the characteristics of an individual's handwriting is created.

By using a computer to improve the appearance of personal handwriting in this way, and then incorporating the improved handwriting into an image or other gift article, the perceived acceptability of the gift, especially on the part of the giver, is greatly improved.

ADVANTAGES

This invention provides an advantage in the creation of personalized articles bearing a handwritten inscription. By applying this invention, the difficulty encountered by individuals dissatisfied with their personal handwriting is overcome. The technique is flexible in its use of a variety of writing styles and in the incorporation of a variety of handwriting attributes. The invention allows one to improve the appearance of their personal handwriting by creating a more consistent appearance or by incorporating a variety of desired attributes. The method can be implemented automatically or with manual assistance, with the use of readily available tools and does not require the categorization of characters or complex analysis of character formation and structure.

BRIEF DESCRIPTION OF THE DRAWINGS

FIG. 3 is a flow chart showing the steps employed to process the digital image of a sample of handwriting according to a preferred mode of practicing the present invention;

FIG. 4 is a sample of handwritten text to be processed according to the present invention;

FIG. 5 is a normative version of the handwritten sample shown in FIG. 4;

FIG. 6 shows the improved text resulting from combining the text of FIGS. 4 and 5 according to the invention;

FIG. 7 is a flow chart illustrating the steps of the method employed to process the digital image of a sample of handwriting according to an alternate mode of practicing the present invention;

FIG. 8 is a diagram illustrating the multiple handwritten samples of identical text used in the alternate mode of practicing the method of the present invention;

FIG. 9 is a diagram illustrating the improved sample of handwriting resulting from the alternate method of practicing the present invention; and FIGS. 10–20 are diagrams useful in describing the details of one method of processing a sample of handwriting according to the preferred mode of practicing the invention.

DETAILED DESCRIPTION OF THE INVENTION

Figure 1:
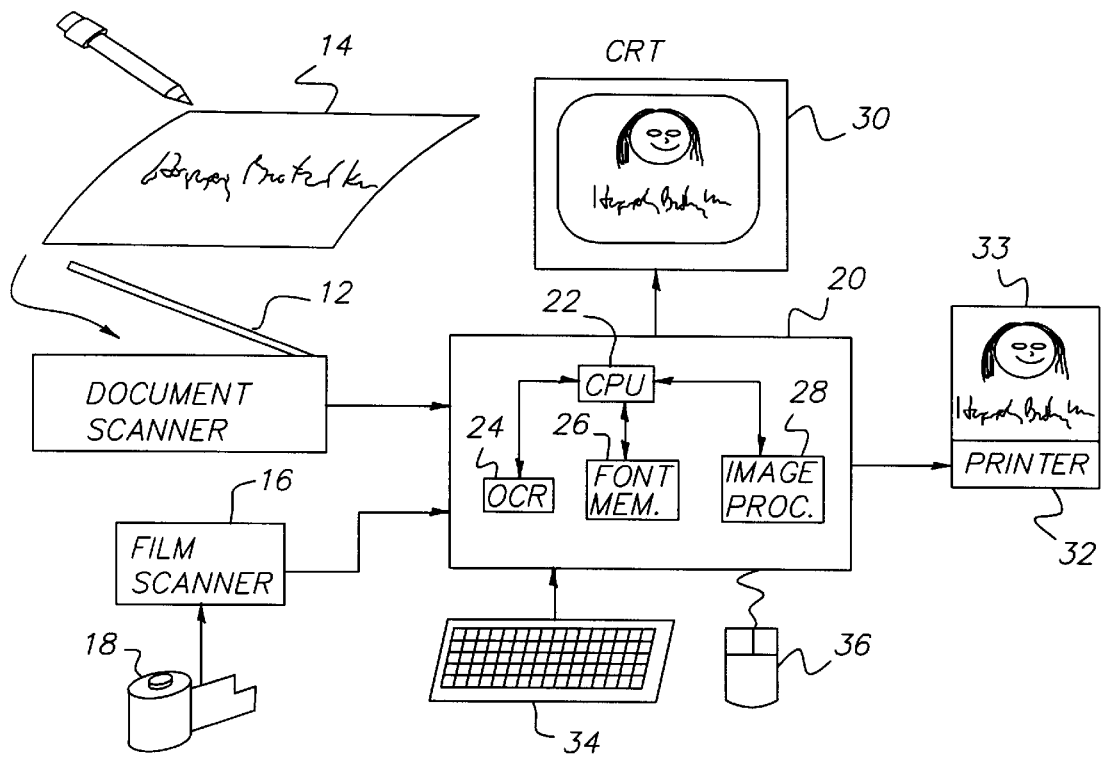
FIG. 1 is a schematic diagram illustrating a hardware system useful for practicing the present invention.

The hesitance to use personal handwriting on images and articles is overcome by the computer assisted method of the present invention for improving the appearance of personal handwriting. Referring first to FIG. 1, a system on which the present invention can be practiced is shown. This system is offered as an example, for as will become apparent, the method of the present invention can be practiced on systems having various other arrangements of elements. The system 10 includes a document scanner 12 that can scan a sample of handwritten text 14 to create a bit mapped image of the text. The system may optionally include means for generating a digital photographic image, such as a film scanner 16 for scanning images from a roll of photographic film 18. The scanners 12 and 16 are connected to a computer 20. The computer 20 is a standard computer such as a PC that includes a central processing unit (CPU) 22 that is supplied with optical character recognition (OCR) software 24, a font memory 26 containing a normative handwriting font, and an image processing software package 28. The system also includes a color CRT display 30, and a color printer 32 for producing a color print 33. The operation of the computer and peripheral equipment is controlled via a keyboard 34 and a mouse 36 connected to the computer 20.

Figure 2:
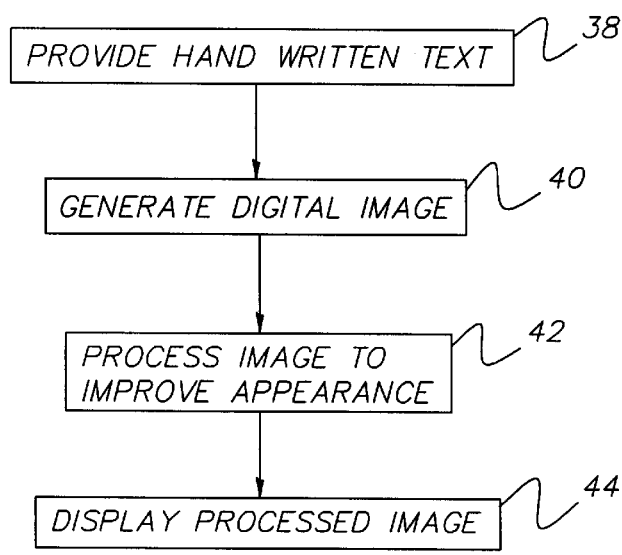
FIG. 2 is a flow chart illustrating the steps of the method employed to produce handwriting having improved appearance according to the present invention.

Referring to FIGS. 1 and 2, the handwriting improvement method according to the present invention is performed on a system shown in FIG. 1 as follows. First, a sample of the desired handwriting is provided (38) by the person whose handwriting is to be improved. This first step of obtaining a personal handwriting sample is generally done by asking the individual to write with a common pen or pencil onto a sheet of paper in a designated area. The sample can be of either connected text (cursive writing) or of individual characters (either cursive or normally disconnected characters such as block characters).

Second, a digital image of this handwriting sample is generated (40), for example by scanning the sample on the scanner 12, and entered into the computer 20. The second step requires that the personal handwriting sample be entered into a computer. This is typically done by scanning the paper on which the sample is written to obtain an image of the sample. Existing tools and algorithms for differentiating the text image from the background of the second image are readily available. Alternatively, computer-human interface tools (such as a mouse or tablet) that mimic a user's hand and finger motions may be used to enter the text. Next, the digital image of the sample is processed in the computer 20 to improve its appearance (42). Finally the processed image is displayed (44), for example on the CRT 30 or printed out on printer 32. Generally, the improved text image will be combined with another image such as a photographic image to form a composite image (i.e. composited) before it is printed out.

Referring to FIG. 3, the step (42) of processing the image to improve its appearance according to a preferred mode of carrying out the present invention, will be described. First, an alphanumeric coded representation (such as ASCCI code) of the handwriting text is created (46). FIG. 4 shows a sample of handwritten text with poor handwriting. Two approaches may be taken to create the alphanumeric coded representation of the individual's handwriting sample (step 46). If the textual content of the personal sample is known and operator intervention is available, the equivalent text may be entered by an operator via the keyboard 34 (see FIG. 1). If the textual content is not known or cannot, for other reasons such as the lack of an operator, be entered into the computer, the textual content can be derived with the use of optical character recognition software 24 in computer 20. This commercially available tool can be used to create an alphanumeric coded representation of the personal handwriting sample. Yet another approach to creating a personal handwriting image sample (combining steps 38 and 40) is to enter the personal text via the keyboard 34, which generates the alphanumeric coding and then to render the personal text with a pre-existing personal font. One service for generating personal fonts, Signature Software, Inc., Portland, Oreg., uses the technique described in U.S. Pat. No. 5,412,771.

Next, the text is rendered (48) from the coded representation using a normative handwriting font to create a digital image of a normative version of the handwriting sample. The known text is rendered into the preferred, normative handwriting form using a preferred normative typeface. A preference for the appearance of the handwriting may be expressed by the individual, the operator, or the designer of a gift into which the handwriting is to be placed. The normative version of the handwritten text, shown in FIG. 5, represents an ideal, preferred appearance which the individual's handwriting seeks to achieve. The normative font that is used as the ideal handwriting representation may be obtained from a font version of the standard handwriting taught to children. While this varies from place to place the standard is generally considered to represent "good" writing. For example the Palmer or Zaner-Bloser letter-forms are often taught to children in the United States. However, it is not essential that the normative handwriting be that of an existing educational standard.

At this point, digital images of two handwriting samples exist: the personal and the normative. Finally, these representations are combined (50) to produce the digital handwriting image having improved appearance, shown in FIG. 6. For cursive handwriting, the combination of the personal and normative digital images can be done at either the word or letter level. Words with connected characters can be treated as very complex characters and combined in the same way that single, individual characters can. If characters are not connected, the process is similar, but easier, since character ligatures are not as difficult to deal with. Note that the size of the characters or words must be normalized as the samples can come in various sizes.

If the sample handwriting is not properly connected character-by-character but a cursive result is desired, essentially the same process is followed. Given disconnected input character images, however, the combination of the normative and personal samples must be done on a character-by-character basis despite the fact that the output image will be rendered in a cursive (connected) style. Once the individual character combination is accomplished, the complete connected text can be rendered and then printed. Note, however, that care must be taken in the combination process to maintain the correct connectivity of the ligatures in the cursive, normative font (i.e. the character connection points may not be modified).

The combination of the handwriting samples may be based on a variety of techniques and descriptions of the handwriting. A simple one-bit image of the writing, multi-bit pixel images, or a more complex mathematical description of the writing derived form an analysis of the input characters (such as is used for font description) may be used. Generally, the more complex representation supports a simpler combination step but this will depend on the actual combination technique used.

Referring to FIGS. 10–20, this implementation relies on two concepts, tie points and strokes. Strokes are defined here as single movements of a writing instrument that do not significantly change direction. Each character is made up of a series of strokes which can begin either a new mark or continue a previous mark. Generally, character formation is taught to students as a series of such strokes. For the purposes of this discussion, strokes are those marks that form a character and begin when a writing instrument (pen) is placed on the media (paper) or the movement of the pen changes significantly. FIGS. 10 and 11 show a lower case "f" written in normative script, and in a sample of an individual's handwriting respectively. FIG. 12 shows the normative "f" with strokes 1–4 designated by arrows indicating the direction of the strokes. Tie points are defined as the points at which strokes begin or end. The positioning of these tie points should distinguish the characteristics of the handwriting and may vary according to alphabet or handwriting instructional method. In this embodiment, tie points are placed at the tops of ascenders, the bottom of descenders, and a reversal in direction. FIG. 13 shows the sample cursive "f" with tie points indicated by dots.

The tie points for the normative characters can be ascertained either automatically or manually prior to any customer handwriting improvement and are a constant regardless of customer input. The tie points can be found by using curve following from the commencement of strokes. At junctures where strokes cross each other, the curve which exits the juncture in the direction closest to that in which it entered the juncture should be followed (i.e. go as straight as possible). Whenever the curve changes direction vertically (tops or bottoms of curves) tie points are placed. Whenever the stroke reverses direction a tie point should be placed. The tie points should be labeled sequentially (note that some portions of a curve may be labeled more than once to accommodate partially overwritten strokes) and associated with a particular stroke.

Figure 17:
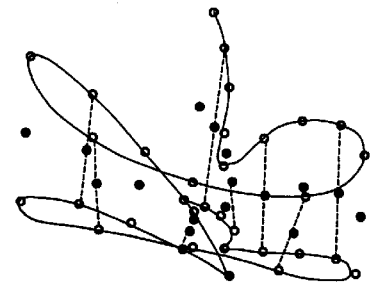
Figure 16:
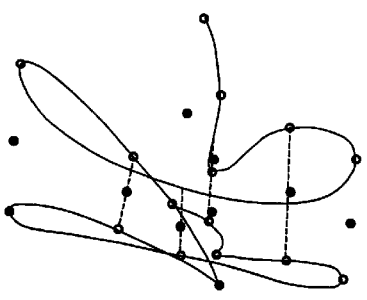
Figure 20:
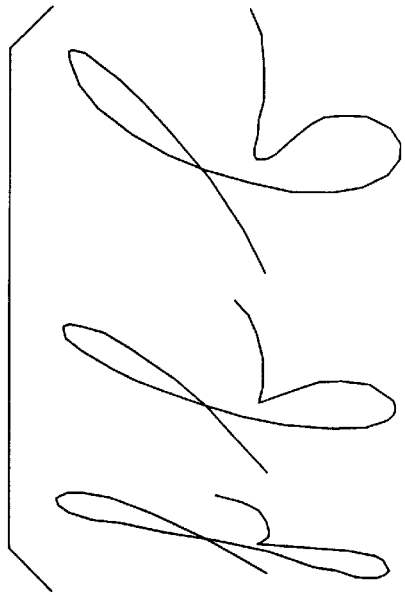
Figure 19:
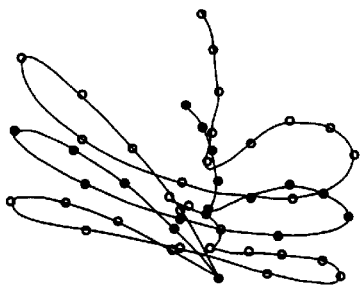

The combination process requires that equivalent tie points and the corresponding strokes for both normative and customer characters be found together with a measure of the stroke length (length of a curve). FIGS. 14 and 15 show the normative script "f" and the sample cursive "f" respectively, which have been normalized to be of equal height. To synthesize the new character, the normalized characters are aligned using the first tie point; see FIG. 16. The new, synthesized, character is formed by first taking the mean location between the corresponding tie points. These intermediate tie points are shown as solid dots in FIG. 16. Each intermediate tie point is the beginning or end of a new stroke. The points between the tie points create the new stroke and are formed by creating new points positioned at the mean of the corresponding points (by distance) on the normative and customer characters. That is, the mid-point of the new character stroke will be the mean position between the mid-points of the corresponding normative and customer character stroke. FIG. 17 shows the sample characters with the stroke mid points indicated, and new intermediate tie points formed from the stroke mid points shown as solid dots. Next, quarter-point tie points halfway between the mid-points and the original tie points are found, and intermediate tie points between the characters are generated. FIG. 18 shows the sample characters with the stroke quarter points indicated and the new intermediate tie points formed from the stroke midpoints and quarter points shown as solid dots. Finally, strokes are formed starting with the first tie point, and progressing through the intermediate tie points to form the new character having improved appearance. FIG. 19 shows the strokes through the intermediate tie points forming the new character. FIG. 20 shows the normative, new and sample characters side by side (left to right) without the tie points.

To assist in the task of finding the tie points in a customer character corresponding to a normative character, the position of the first tie point in a normative character can be used as the start location of a search for the corresponding tie point in the customer character. Information about the direction of the stroke and crossing strokes can be used to aid the curve following process and location of the customer character tie points. Character images should be normalized in either the vertical or horizontal dimension (not both as the character's aspect ratio must be maintained) and the strokes reduced to single pixel line widths.

The combination process is essentially identical for disconnected character writing (block characters), connected character writing (cursive characters), and for whole word cursive characters. The only differences are that for block characters, most strokes begin and end with the pen moving onto or off of the paper. For whole words, the entire word can be treated as a single, very long cursive character. Tie points connecting characters can be retained.

After a new character or word has been created, the character pixels can be thickened to improve the appearance. This can be done using a dilation process or by simply increasing the width (or height) of each pixel to achieve various effects.

An analysis of the characters including attributes such as crossing points, slant, eccentricity of rounded strokes, length of ascenders or descenders may be used. Attributes other than clarity or consistency of character formation may also be desired for one's handwriting. One might desire a more masculine, feminine, modem, or old-fashioned look, for example. By selecting the appropriate normative handwriting typeface, these attributes can be integrated into personal handwriting.

An alternative approach to processing the digital image (step 42 of FIG. 2) to creating improved handwriting according to the present invention is shown in FIG. 8. First, a number of additional samples from the same individual are obtained (52). Additional digital images of the samples are generated (54) for example by scanning. An example of three such samples are shown in FIG. 8. Finally, all of the digital images are combined (56) as described above with respect to FIG. 7 to produce the improved handwriting sample, since the combination of the group of samples produces an improvement over any one sample. An example of the result is shown in FIG. 9. In this case, actually recognizing the text content is not necessary since no normative handwriting sample must be created. This approach tends to maintain the characteristics of the individual's handwriting in a way that a combination with a normative text will not. Effectively, this technique creates an artificial handwriting that mimics the writer's best hand for that sample.

It is also possible to extend the combined handwriting sample into a complete font. Since services to create fonts based on existing handwriting samples already exist, one can simply extend the handwriting sample created to meet the requirements for creating a font and then requesting the creation of the complete font.

The invention has been described in detail with particular reference to certain preferred embodiments thereof, but it will be understood that variations and modifications can be effected within the spirit and scope of the invention.

PARTS LIST 10 system
12 document scanner
14 sample of handwritten text
16 film scanner
18 photographic film
20 computer
22 CPU
24 OCR software
26 font memory
28 image processing software
30 CRT
32 color printer
33 color print
34 keyboard
36 mouse
38 provide handwriting step
40 generated digital image of handwriting step
42 process digital image of handwriting step
44 display processed image step
46 create alphanumeric coded representation of handwriting sample step
48 render text step
50 combine digital images step
52 obtain additional samples of personal handwritten text step
54 generate additional digital images step
56 combine digital images step

What is claimed is:

1. A computer implemented method for generating an image of handwritten text, comprising the steps of:
   a) providing a handwritten sample of the text;
   b) generating a digital image of the handwritten sample;
   c) processing the digital image of the handwritten sample to generate a digital image of text having improved appearance of clarity and consistency of character formation, wherein the processing step includes the steps of:
      i) generating an alphanumeric coded representation of the handwritten sample,
      ii) rendering the alphanumeric coded representation in a normative handwriting font to create a digital image of a normative version of the handwritten sample; and
      iii) combining the digital images of the normative version and the handwritten sample to produce the digital image having improved appearance; and
   d) displaying the digital image having improved appearance.

2. The method claimed in claim 1, wherein the processing step includes the steps of:
   i) providing additional handwritten samples of the text;
   ii) generating digital images of the additional handwritten samples; and
   iii) combining the digital image of the handwriting sample with the digital images of the additional handwriting samples to produce the digital image having improved appearance.

3. The method according to claim 1 wherein the sample handwriting has connected characters.

4. The method according to claim 1 wherein the sample handwriting has disconnected characters.

5. The method according to claim 1 wherein the digital image of the handwriting sample is produced by scanning the handwriting from paper.

6. The method according to claim 1 wherein the digital image of the handwriting sample is produced by manually entering text on a computer input device and rendering the entered text in a computer using a personalized font.

7. The method according to claim 1 wherein the alphanumeric coded representation of the handwritten sample is generated by scanning the handwritten sample and using optical character recognition on the scanned image.

8. The method according to claim 1 wherein the alphanumeric coded representation of the handwritten sample is generated by manually entering the text via a computer input device.

9. The method according to claim 1 wherein the characters of the words in the digital image of text having improved appearance are connected.

10. The method according to claim 1 wherein the characters of the words in the digital image having improved appearance are disconnected.

11. The method according to claim 1 wherein the handwriting sample having approved appearance is used to create a personalized product by compositing with another image.

12. The method according to claim 1 including the step of normalizing the digital images of the normative version and the handwritten sample to a similar size before combining them.

13. The method according to claim 1, wherein the digital images of the normative version and the handwritten sample represented as pixel-based images and the pixel based images are combined to form the image having improved appearance.

14. The method according to claim 1, wherein the digital images of the normative version and the handwritten sample are represented as mathematically-defined curves, and the curves are combined to form the image having improved appearance.

* * * * *